US010449456B2

United States Patent
Manchanayake et al.

(10) Patent No.: US 10,449,456 B2
(45) Date of Patent: Oct. 22, 2019

(54) METHOD AND SYSTEM OF VERIFYING A FILE FOR USE IN A GAMING MACHINE

(71) Applicant: Ainsworth Game Technology Limited, Newington (AU)

(72) Inventors: Waruna Manchanayake, Cherrybrook (AU); Bahee Gnanasundram, Wentworthville (AU)

(73) Assignee: Ainsworth Game Technology Limited, Newington, NSW (AU)

( * ) Notice: Subject to any disclaimer, the term of this patent is extended or adjusted under 35 U.S.C. 154(b) by 392 days.

(21) Appl. No.: 15/296,805

(22) Filed: Oct. 18, 2016

(65) Prior Publication Data

US 2018/0078859 A1 Mar. 22, 2018

(30) Foreign Application Priority Data

Sep. 20, 2016 (AU) .................................. 2016231504

(51) Int. Cl.
*A63F 13/73* (2014.01)
*G07F 17/32* (2006.01)

(52) U.S. Cl.
CPC .............. *A63F 13/73* (2014.09); *G07F 17/32* (2013.01); *A63F 2300/201* (2013.01)

(58) Field of Classification Search
CPC ........... G06F 17/32; A63F 13/73; G07F 17/32
USPC .............. 707/693, 999.001; 463/29; 375/240
See application file for complete search history.

(56) References Cited

U.S. PATENT DOCUMENTS

| 5,533,051 A * | 7/1996 | James ..................... G06T 9/005 341/51 |
| 6,416,410 B1 | 7/2002 | Abou-Samra et al. |
| 6,868,403 B1 * | 3/2005 | Wiser ...................... G06F 21/10 705/1.1 |
| 7,707,642 B1 * | 4/2010 | Herbach ........... G06F 17/30011 726/27 |
| 8,108,672 B1 * | 1/2012 | Herbach ............. G06F 21/6218 705/51 |
| 2006/0184505 A1* | 8/2006 | Kedem ................. G06F 3/0608 |
| 2007/0021195 A1* | 1/2007 | Campbell ............... G07F 17/32 463/29 |
| 2010/0103183 A1 | 4/2010 | Lin et al. |
| 2013/0212151 A1* | 8/2013 | Herbach ................. H04L 67/42 709/203 |

FOREIGN PATENT DOCUMENTS

| CN | 101583031 | 11/2009 |
| CN | 202217322 | 5/2012 |

\* cited by examiner

*Primary Examiner* — Dung K Chau
(74) *Attorney, Agent, or Firm* — Cook Alex Ltd.

(57) ABSTRACT

The invention provides a method of verifying a computer readable file for use in a gaming machine, comprising reading at least one portion of the computer readable file and compressing the at least one file portion to reduce its file size into a compressed file portion. A compressed computer readable file is assembled using the compressed file portion and is then processed through a verification algorithm to verify that the compressed computer readable file is authorised for use in the gaming machine. A system for verifying a computer readable file for use in a gaming machine is also provided.

20 Claims, 10 Drawing Sheets

METHOD AND SYSTEM OF VERIFYING A FILE FOR USE IN A GAMING MACHINE

BACKGROUND

The present invention relates to a method and system of verifying a computer readable file for use in a gaming machine and in particular a method and system of verifying a game file for use in a gaming machine. The invention has been developed primarily for use as an electronic gaming machine and will be described hereinafter by reference to this application. However, it will be appreciated that the invention may also be implemented for any type of gaming machine that uses software to implement the game played on the gaming machine, including an electro-mechanical gaming machine.

The following discussion of the prior art is intended to present the invention in an appropriate technical context and allow its advantages to be property appreciated. Unless clearly indicated to the contrary, however, reference to any prior art in this specification should not be construed as an express or implied admission that such art is widely known or forms part of common general knowledge in the field.

Conventional gaming machines typically involve displaying a game and awarding prizes to a player according to predetermined combinations of game symbols that appear on an array of game squares displayed on a screen, typically organised into three rows and five columns (a 5×3 array). Other arrays, such as a 3×3 or 4×3, may be used. Each gaming machine randomly selects the game symbols that appear on the array, each column of the array being a "reel".

One type of gaming machine comprises a mechanical or electro-mechanical device, where a motor rotates a plurality of annular rings or drums that form reels. Each reel has a reel strip that displays game symbols in preset game symbol positions. A frame covers the rings to provide a window through which only a subset of game symbol positions (and hence game symbols) were visible to the player. Thus, for a game using a 5×3 array, the window would only permit three rows of five rings to be visible to create the game array. An internal game controller within the gaming machine controls operation of the motor and hence rotation of the reels. Thus, by controlling when each reel starts and stops in its respective rotation, the game controller controls the display of the game symbols in the window. Sensors linked to the reels indicate which game symbols are displayed in the window and communicate with the game controller so that the game controller is able to award prizes based on winning combinations of game symbols displayed on the reels in the window. The game controller typically comprises one or more electric circuits for controlling various functions of the gaming machine, such as the above mentioned control of the motor, communicating with the sensors, verifying that the correct amount of a bet has been made via one or more value receiving mechanisms to enable operation of the motors, controlling any visual and/or audio effects associated with operation of the gaming machine and controlling operation of various alarms to alert any tampering with the gaming machine.

Another type of gaming machine, known as an electronic gaming machine or EGM, replaces the mechanical reels and motor with a video display screen on which video images of the reels are displayed. The EGM has an internal electronic game controller, typically a computer, that controls the display of images on the video display screen so that the reels are visibly spun on the screen to simulate a physical reel of a traditional gaming machine. EGMs tend to be more versatile in providing game information, varying the probabilities for a player to win a prize and varying the type of game that is played.

When games are implemented for play on a gaming machine, a game file is typically uploaded onto the memory storage of the internal game controller of the gaming machine. In the case of an electro-mechanical gaming machine, the internal game controller then operates the electrical circuits that in turn drive the motors to rotate the mechanical reels and operate the sensors. In the case of an EGM, the software loaded onto the memory storage, the electronic game controller controls the images displayed to perform the game on the EGM.

Development of new gaming platforms, especially for EGMs, has permitted the use of higher quality images for display, which means larger image sizes or "slices" of around or in excess of 4 GB. This in turn increases the size of any game file that must be installed in the EGM to implement the game. However, any files received by an EGM must be authenticated or verified before being permitted to be used on the EGM for two primary reasons. Firstly, the game file must be authorised for use under license by the operator of the EGM. Secondly, a game file must be compliant with the specification of the game as approved by regulatory authorities of the jurisdiction in which the EGM is located. The requirement for verification of the files installed in the EGM means that game files have to be processed by the relevant regulatory authority, system provider or venue operator using a monitoring system that applies the authentication or verification software. Where the game file size is significantly large, there may be delays in the verification process or even an inability to verify the game file, since the monitoring system is frequently limited by the processing power and/or memory of the processor(s) used by the monitoring system.

One method of processing a game file, which is typically in the form of a game card (comprising a maths file, graphics file and sound file) involves extracting only the math file and ignoring the associated graphics and sound files to generate the call signal that is processed by the verification algorithm used by the verification software in the gaming machine. This method enables faster processing as the math file is much smaller in size than the graphics file, which is usually the largest in file size. However, this method can lead to corruption of the game card and/or errors. For example, the math file may require a Jack symbol to be displayed but instead due to a reading error, a Jackpot symbol is shown. Errors of this type leading to a mismatch between what game symbols are meant to be shown to what is in fact shown on the display of the EGM results in rejection of the game file, preventing its use in the EGM and require replacement of the game card on the EGM and repetition of the verification process by the monitoring system, incurring additional expense.

Also, different EGMs may use different maths files and different algorithms, presenting a constant hurdle for large file sizes greater than 4 GB. In each case, it would be necessary to change the image slice for each type of EGM to match the file size limit.

Furthermore, older gaming machines have processors or game controllers with lower processing power and/or memory. Hence, these older gaming machines are unable to handle large file sizes, and so are unable to be updated with new games. Thus, there is a limit on the file size for a game file in order for the game to be installed on an older gaming machine.

It is an object of the present invention to overcome or substantially ameliorate one or more of the disadvantages of prior art, or at least to provide a useful alternative.

SUMMARY

One embodiment of the invention provides a method of verifying a computer readable file for use in a gaming machine comprising:

reading at least one portion of said computer readable file;

compressing said at least one file portion to reduce its file size;

assembling a compressed computer readable file using said compressed file portion; and processing said compressed computer readable file through a verification algorithm to verify that said compressed computer readable file is authorised for use in said gaming machine.

Another embodiment of the invention provides for verifying a computer readable file for use in a gaming machine, comprising:

a non-transitory computer readable carrier medium storing said computer readable file; and a computing device configured to:

access said computer readable file on said computer readable carrier medium;

read at least one portion of said computer readable file;

compress said at least one file portion to reduce its file size; and wherein a compressed computer readable file is assembled using said compressed file; and said compressed computer readable file is processed through a verification algorithm to verify that said compressed computer readable file is authorised for use in said gaming machine.

A further embodiment of the invention provides a network of gaming machines in electronic communication with a computing device, wherein said computing device is adapted to perform the method of the above described embodiment of the invention.

Yet another embodiment of the invention provides a computer system comprising a central processing unit configured for communication with a gaming machine, wherein said computer system is configured to perform the method of the above described embodiment of the invention.

A further embodiment of the invention provides a computer program configured to perform the method of the above described embodiment of the invention.

A further embodiment of the invention provides a non-transitory computer readable carrier medium carrying computer executable code that, when executed on a central processing unit configured for communication with a gaming machine, causes the central processing unit to perform the method of the above described embodiments of the invention.

Throughout the specification and unless explicitly stated otherwise, the term "value" means credits, gaming tokens, coins, paper, currency, tickets, vouchers, credit cards, debit cards, smart cards, memory devices capable of storing value and any other object representative of value.

Unless the context clearly requires otherwise, throughout the description and the claims, the words "comprise", "comprising", and the like are to be construed in an inclusive sense as opposed to an exclusive or exhaustive sense; that is to say, in the sense of "including, but not limited to".

Furthermore, as used herein and unless otherwise specified, the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

BRIEF DESCRIPTION OF THE DRAWINGS

Preferred embodiments of the invention will now be described, by way of example only, with reference to the accompanying drawings in which.

DETAILED DESCRIPTION OF VARIOUS EMBODIMENTS

Figure 1:
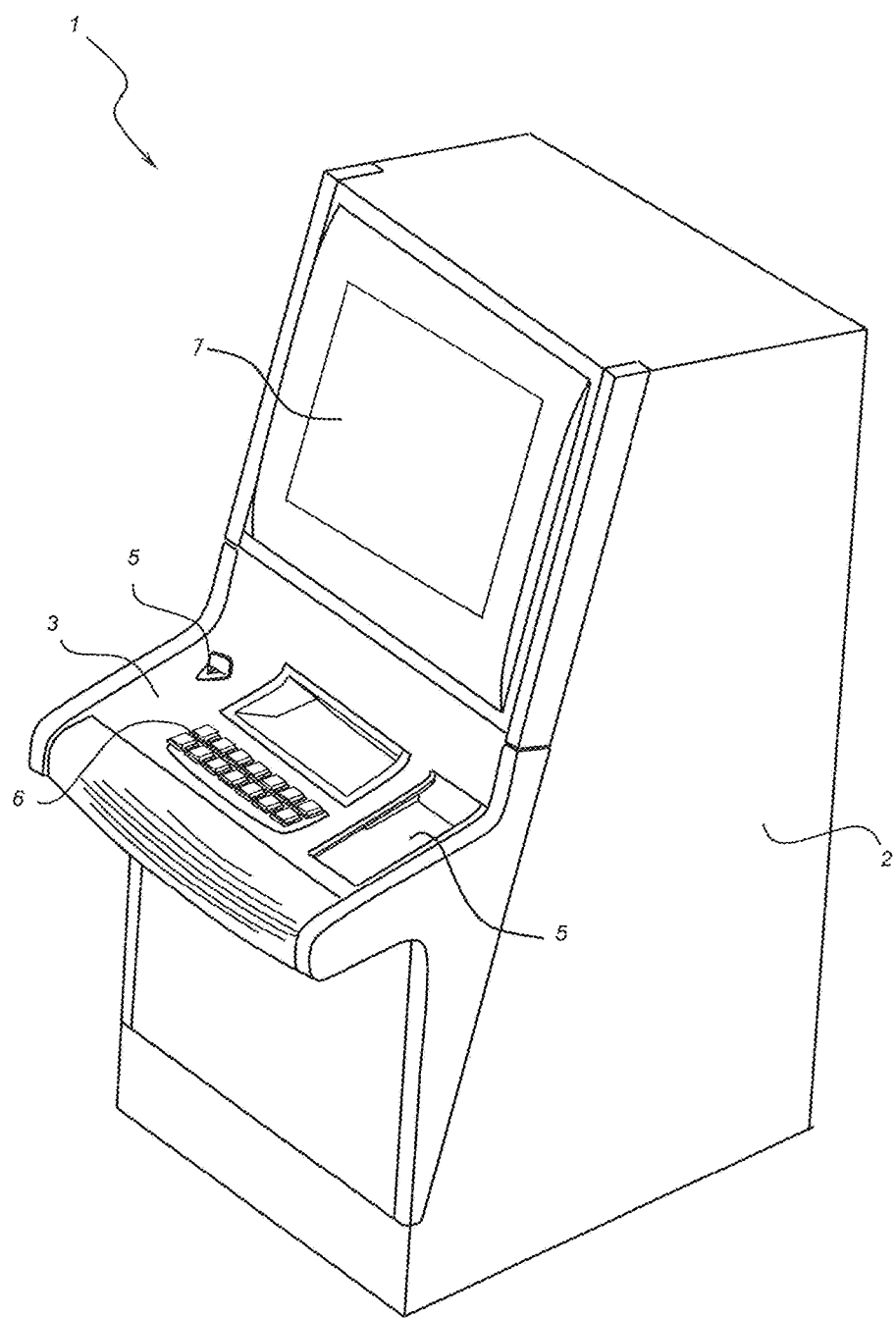
FIG. 1 is a perspective view of a gaming machine.

The present invention will now be described with reference to the following examples which should be considered in all respects as illustrative and non-restrictive. In the Figures, corresponding features within the same embodiment or common to different embodiments have been given the same reference numerals.

By way of general discussion, the structure and operation of a gaming machine will now be described to provide context for the application of the invention to a gaming machine. Referring to FIG. 1, a gaming machine 1 comprises a cabinet 2, a console 3 and an internal game controller 4. The console 3 has various input devices including vending slots 5 for receiving monetary bets and a plurality of buttons 6 for actuation by a player. It will be appreciated that in other embodiments the vending slots 5 may be replaced with other types of value input/value output devices, such as a coin acceptor, a paper currency acceptor, a ticket reader and/or printer or a card reader and/or writer.

The vending slots 5 can be configured to receive value, such as cash in the form of banknotes and coins, or credits representing a monetary amount from a memory device, such as but not limited to a memory card, smart card, a radio frequency identification (RFID) device, USB key, magnetic card or other electronic storage device.

Typically, the memory device is a credit card, debit card or other card that enables the transfer of monetary credit to the gaming machine 1. Other forms of value include gaming tokens, paper, tickets, vouchers, and any other object representative of value.

Figure 2:
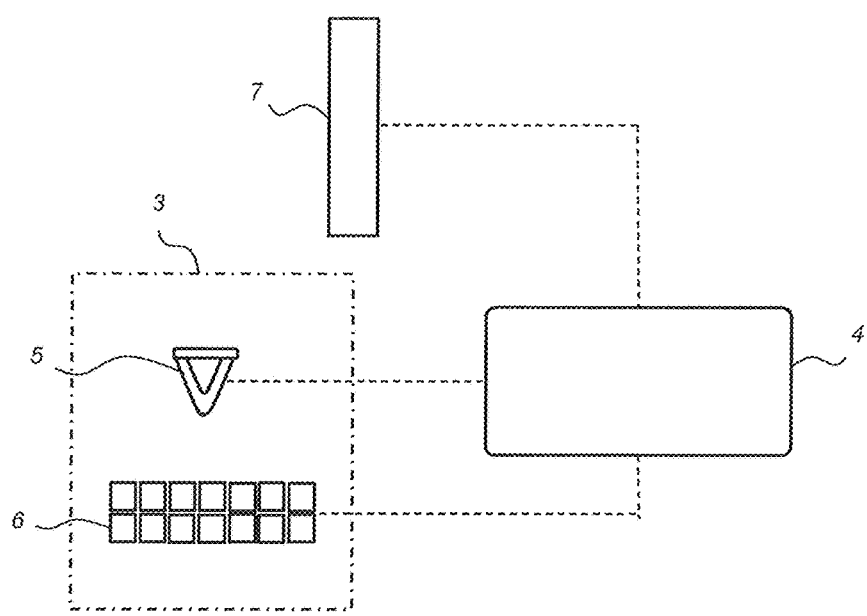
FIG. 2 is a schematic drawing of a game controller for the gaming machine of FIG. 1.

The game controller 4 is generally in the form of an electronic game controller comprising a central processing unit, such as a microprocessor or other computing device, and is in electronic communication with a display in the form of a video display screen 7, as well as various input devices on the console 3, as best shown in FIG. 2. Typically, the electronic game controller 4 also comprises a random access memory (RAM) associated with the central processing unit, the RAM being used to store program instructions and transient data related to the operation of the electronic game controller and hence the gaming machine 1. The RAM contains a body of program instructions for implementing a game on the gaming machine 1, as discussed in more detail below. The central processing unit or processor may also be operatively associated with a further storage device, such as a hard disk drive, which is used for long-term storage of program components and data relating to the electronic game controller 4 and/or the gaming machine 1, including a database for game performance data, as well as information gathered from users. It is also appreciated that a person skilled in the art would readily understand the location and use of the electronic game controller 4 in the gaming machine 1.

The electronic game controller 4 will transmit and receive signals to and from each of the input devices and the display 7, usually via wired connections but can include wireless modes of electronic communication, such as WLAN. In the case of the vending slots 5 (or with any other type of value transfer mechanism), there may be an intermediate credit verification device that examines and verifies the cash or credits received by the vending slots. Once the value (such as cash or credits) have been verified by the credit verification device, a signal is sent to the electronic game controller 4, which then determines whether the minimum bet level has been reached. If so, the electronic game controller 4 will permits play of the game on the gaming machine 1. If not, the electronic game controller 4 will send a signal to the display 7 to show a message requesting further value to be added to the gaming machine 1.

Figure 3:
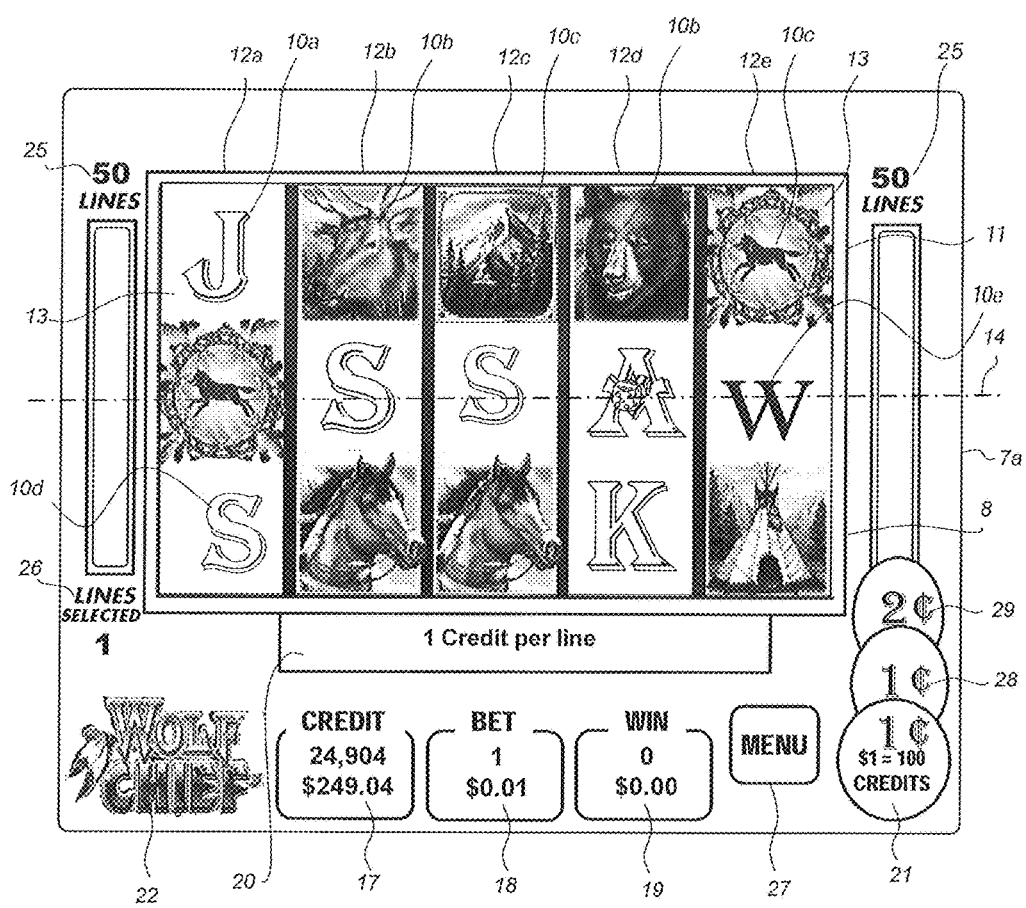
FIG. 3 is a front view of the display of the gaming machine of FIG. 1 illustrating a game.

The electronic game controller 4 is programmed to provide a game in the form of a base game 8 (as best shown in FIG. 3) and a feature game 9 (not shown) on a lower playing area 7a of the display 7 of the gaming machine 1 for play by a player. An upper display area (not shown) is reserved for showing artwork associated with the game(s) that are available for play on the gaming machine and/or other game information. The base game 8 has game symbols 10 arranged into an array 11 in the form of five columns or "reels" 12. The reels 12 give the visual appearance of rotating, typically by having the game symbols 10 move in a downward linear path along the length of each reel 12. While the array 11 is arranged with five reels 12 and three rows as per the industry standard, it will be appreciated by one skilled in the art that other types of arrays could be used, such as 3×3, 4×3, 5×5, 4×4, etc, including arrays having an irregular number of rows and/or columns. For example, the array 11 can have an unequal number of rows and/or columns, where some columns have less or more rows than other columns or where some rows have less or more columns than other rows. A more specific example would be an array having three columns with only two rows and two columns with three rows. The electronic game controller 4 will transmit signals to the display screen 7 to cause the base game 8 and feature game 9 to be played on the lower playing area 7a, including showing the game symbols 10, array 11 and other visible elements of the games.

The array 11 of the base game 8 defines predetermined game or symbol positions 13, in which the game symbols 10 appear. The symbol positions 13 are not visually marked by boundary lines and simply provide an area for the game symbols 10 to appear. However, it will be appreciated that in other embodiments, the symbol positions 13 are defined by visible boundary lines (to define "squares" or game positions) or other markings to define each respective area of the symbol positions.

The array 11 is arranged so that a player can select one or more predetermined "pay lines" 14 defined around the array, which correspond to combinations of the symbol or game positions 13. The pay lines 14 correspond to the lines selected by the player and generally comprise at least one game position or symbol position 13 from each reel 12. The number of pay lines 14 that can be selected by the player depends on the amount of the monetary bet for playing a game on the array 11. In the base game 8, predetermined winning combinations of randomly selected game symbols 10 result in the award of prizes to the player.

The game symbols 10 can include a mixture of picture symbols (such as animal symbols or playing card symbols), word symbols, scatter symbols, substitute or wild card symbols and trigger symbols to trigger the feature game 9. Those skilled in the art will readily understand that a substitute symbol is able to act as any other game symbol, and hence is also known as a "wild card" symbol. Likewise, those skilled in the art will readily understand that a scatter symbol is a symbol that triggers a game event or confers an award without having to appear on a player-selected pay line 14. Similarly, a trigger symbol is a symbol that triggers a game event or confers an award, where the trigger symbol may or may not have to appear in combination and may or may not have to appear on the same player-selected pay line 14. In this embodiment, the game symbols 10 include playing card symbols 10a, animal-themed symbols 10b, item-themed symbols 10c, scatter symbols in the form of S symbols 10d and a substitute or wild card symbol in the form of W symbols 10e. The electronic game controller 4 randomly determines the appearance of the game symbols 10 on the array 11.

The video screen 7 also displays other standard game information including the amount of player credits 17, the amount of the current bet wagered by the player 18, the amount of wins by the player 19, a message area 20, a current denomination button 21 indicating the currently selected base bet denomination, the name 22 of the game that the base game 8 belongs to, being Wolf Chief™, the number of pay lines available 25 and the number of player-selected pay lines 26. The video screen 7 also displays a menu button for bringing up a menu screen 27 (typically explaining the game rules and showing the available pay lines 14), any denomination images 28, 29 that "pop" up when the denomination button 21 is selected and/or jackpot information relating to the base game 8 and feature game 9 that are awarded by the electronic gaming machine (EGM) 1. This jackpot information is typically displayed in the upper display area and can comprise, in descending order of monetary value, a grand jackpot, major jackpot, minor jackpot and midi jackpot.

In the base game 8, the player initially makes a bet using vending slots 5 to initiate play of the gaming machine 1 by building up credit to play the base game 8 on the gaming machine. For example, the player can bet or wager monetary amounts equivalent to a particular amount of credits, depending on the bet denomination selected for the base game. Also, the player can make any additional side bets or ante-bets during play of the base game 8 once the base game has commenced to access additional features in the base game, such as increasing the number of winning combinations in the base game.

Typically, gaming machines offer a number of preset bet options that the player can make, and these bet options can vary depending on the game or games offered on the gaming machine. For example, a game on a gaming machine may provide bet options of 1 credit, 2 credits, 5 credits and 10 credits per player-selected pay line 14. In another example, the player may bet 1 credit, 2 credits, 5 credits and 10 credits for a preset group or combination of pay lines 14, such as a group of 5 pay lines, 10 pay lines, 20 pay lines, etc.

The gaming machine 1 also has a default bet denomination, which is usually the bet denomination that was previously used in the preceding play of the base game 8. For example, if a person had played the base game 8 with a bet denomination of 5¢, then this would be the default bet denomination for the player when he or she commences play of the game. Where the gaming machine has not yet been played or has been started up, the default bet denomination is initially selected by the electronic game controller 4. The default bet denomination can be randomly selected or chosen according to a predetermined order. Usually, the electronic game controller 4 will select the bet denomination with the lowest value that is available for the base game 8, which would be the 1¢ bet denomination for this embodiment. The player may change the bet denomination at any time in the base game 8 by touching the denomination button 21 before or after the reels 12 have spun. In this embodiment, touching the denomination button will bring denomination images that the player may select to quickly change the bet denomination between plays of the game 8.

Once the player has commenced play of the game 8 by making an appropriate bet via the vending slots 5, the electronic game controller 4 then commences a play of the base game 8 by sending a signal to the display 7 to cause the reels 12 to appear to visibly rotate or "spin" in a linear path, typically in a downward vertical direction, and randomly display the game symbols 10 in each game position for each play of the array 11 for the base game 8. After the reels 12 stop spinning (and thus ends the spin or play of the base game 8), the electronic game controller 4 determines whether there are any predetermined winning combinations of the game symbols 10 appearing in any player-selected pay lines 14, such as a two of a kind, three of a kind, four of a kind or five of a kind for all the game symbols 10 and other combinations of a "full house", "straight" or "flush" for the playing card game symbols 10*a*. It will be appreciated that other winning combinations of game symbols 10 can also be provided. If so, the gaming machine 1 enters a winning game state and awards a prize according to the displayed predetermined winning combination.

The electronic game controller 4 also determines whether the feature game 9 should be activated, based on a predetermined trigger event, such as the appearance of a number of trigger symbols appearing in a play or spin of the base game 8. In this embodiment, the trigger event is the appearance of three scatter symbols 10*d*, as best shown in FIG. 3. The scatter symbols 10*d* need not appear on the same pay line 14, but can appear on any of the player-selected pay lines.

Figure 4:
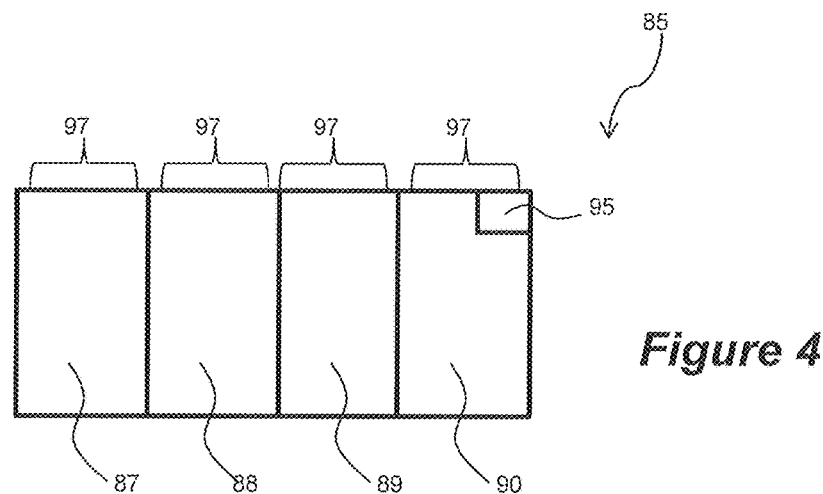
FIG. 4 is a schematic drawing of a game file for use in the gaming machine of FIG. 1.

In response to the trigger event, the electronic game controller 4 then transmits a signal to the video screen 7 to cause the feature game 9 to appear on the video screen 7, as best shown in FIG. 4. In this embodiment, the feature game 9 uses the same game symbols 10 as the base game 8, as well as the same array 11, reels 12, game positions 13 and player-selectable pay lines 14 on the video screen 7. In the feature game 9, ten free plays or spins of the feature game are awarded to the player without having to make an additional bet or wager. It will be understood by those skilled in the art that a free play or spin involves a play of the game without requiring any bet to be made by the player, and that any number of free spins can be chosen for the feature game 9. In addition, it will be appreciated that in the art free spins are commonly referred to as "free games". The number of free games remaining in the feature game 9 is indicated by a counter 51. Typically, the prizes awarded for the same winning combinations of game symbols in the feature game 9 are of higher value than the prizes awarded in the base game 8.

The feature game 9 operates in a similar manner to the base game 8, where the reels 12 visibly rotate and display randomly selected game symbols 10 in each game position 13. Predetermined winning combinations of randomly selected game symbols 10 in the array of the feature game 9 also result in the award of prizes to the player, usually of an enhanced value compared to the prizes awarded in the base game 8.

Figure 5:
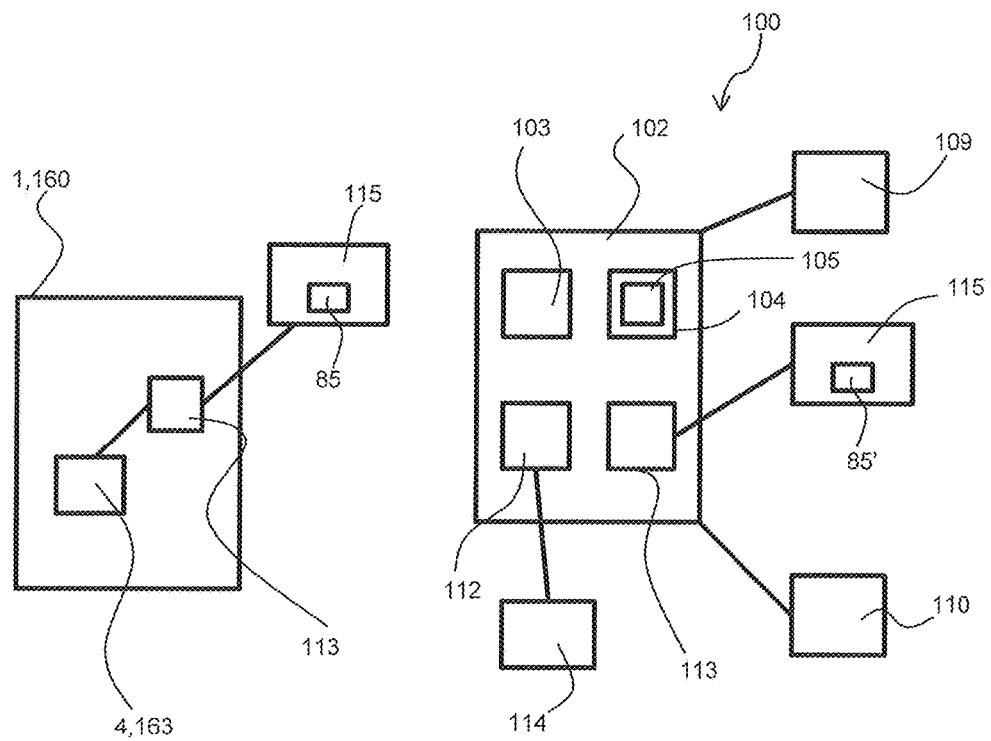
FIG. 5 is a schematic drawing illustrating a system that may be used by a method according to one embodiment of the invention.
Figure 6:
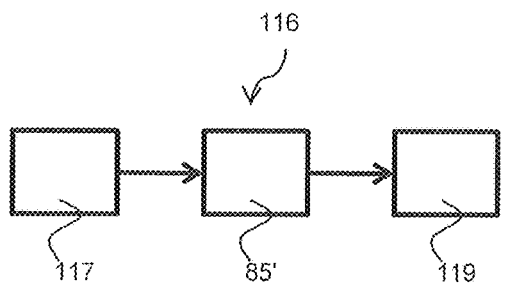
FIG. 6 is a schematic drawing illustrating a game file verification process.

Referring to FIGS. 4 to 6, a method 80 of verifying a computer readable file for use in a gaming machine, such as gaming machine 1, is illustrated by way of general overview. In this embodiment, the computer readable file is a game file for implementing and operating the games 8, 9 on the gaming machine 1. The computer readable game file 85 may comprise data components relating to image information 87, audio information 88, video information 89 and/or game information 90. The game information 90 may include textual information relating to the game rules, game title and other descriptive text, as well as mathematical information for implementing the games 8, 9, such as reel strip information, probability tables and the like. The game file 85 also includes computer executable code to implement the game 8, 9 on the gaming machine 1. The computer readable file 85 also has verification information in the form of a validation token 95 that is designed to confirm that the game file 85 is authorised for use by the operator (casino, club, etc.) in the gaming machine 1 and is compliant with the necessary conditions on which the games 8, 9 have been approved by regulatory authorities. One example of the validation token 95 is described in Australian Patent No. 2011284778 and U.S. Pat. No. 9,027,146, whose specifications are hereby incorporated by reference in their entirety.

When a game file 85 is or is to be installed into an EGM 1, it must also be verified that the game file executes the same game that was approved by the regulatory authority for use in the gaming machine 1. This verification may be performed by the regulatory authority, system provider (the supplier of the gaming system) or venue operator of the gaming machine 1. As a consequence, it is necessary to provide a copy of the game file 85 (designated as 85') to a monitoring system 100 that then verifies the game file copy 85', as best shown in FIG. 5.

In this embodiment, the monitoring system 100 comprises a computing device 102 in the form of a PC having a microprocessor 103 coupled to a memory module 104. Memory module 104 includes software instructions 105, which enable PC 102 to execute a verification algorithm 107 on the game file 85' to verify its authorisation. In some embodiments some or all of software instructions 185 are hosted at a remote location or on an external device. An optional monitor 108 and user input devices 110 (such as mouse/keyboard devices) are coupled to PC 102 thereby to allow interaction with a user. PC 102 additionally includes a first interface 112, presently being a USB interface, and a second interface 113, presently being a flash card read/write interface (optionally provided by way of a PCMCIA card, PC card or the like).

Interface 112 is presently coupled to a USB security device 114. In overview, device 114 provides security data required to enable performance of the verification process. The precise manner by which this is implemented varies between embodiments, including the likes of remote key verification, time-limited keys, and the like. The general rationale is to provide additional security and control in relation to the performance of verification process. Interface 113 is configured for interacting with a portable carrier medium, presently in the form of a Compact Flash card 115. As noted, this is exemplary only, and other embodiments make use of alternate carrier media.

As mentioned above, the CPU 102 applies a suitable verification algorithm 116 (such as a HMAC SHA 1 verification algorithm) to verify that the game file copy 85' (and hence the game file 85) is authorised for use in the gaming machine 1. Typically, one or two verification techniques are used. In one verification technique, one or more "seed values" 117 (that is, number values) are run outside of the monitoring system 100 and are fed to the game file copy 85' to generate corresponding signature results 119 (such as a game outcome). Each seed value 117 and its signature result 119 is then uploaded into the monitoring system 100 and stored in the memory module 104 or other memory storage, including an external memory device (not shown). In the other verification technique, the game file copy 85' is uploaded to the monitoring system 100 and stored in the memory module 104 or other memory storage equivalent accessible by the CPU 102, and the CPU dynamically generates signature results 119 for varying seed values 117.

When the game file 85 is to be verified for use in the gaming machine 1, the monitoring system 100 transmits to the gaming machine one of the seed values 117 and awaits the signature result 119 from the gaming machine. Depending on the verification technique, the CPU 102 either retrieves the stored signature result 119 paired with the sent seed value 117 or calculates the signature result 119 dynamically from the stored seed value. The CPU 102 then compares the signature result 119 it has either stored or calculated and compares it to the signature result calculated by the gaming machine 1. If the signature results 119 match, then the game file 85 is verified for use in the gaming machine 1. If they do not match, then the game file 85 is not verified for use and the gaming machine 1 is disabled. 117.

Figure 7:
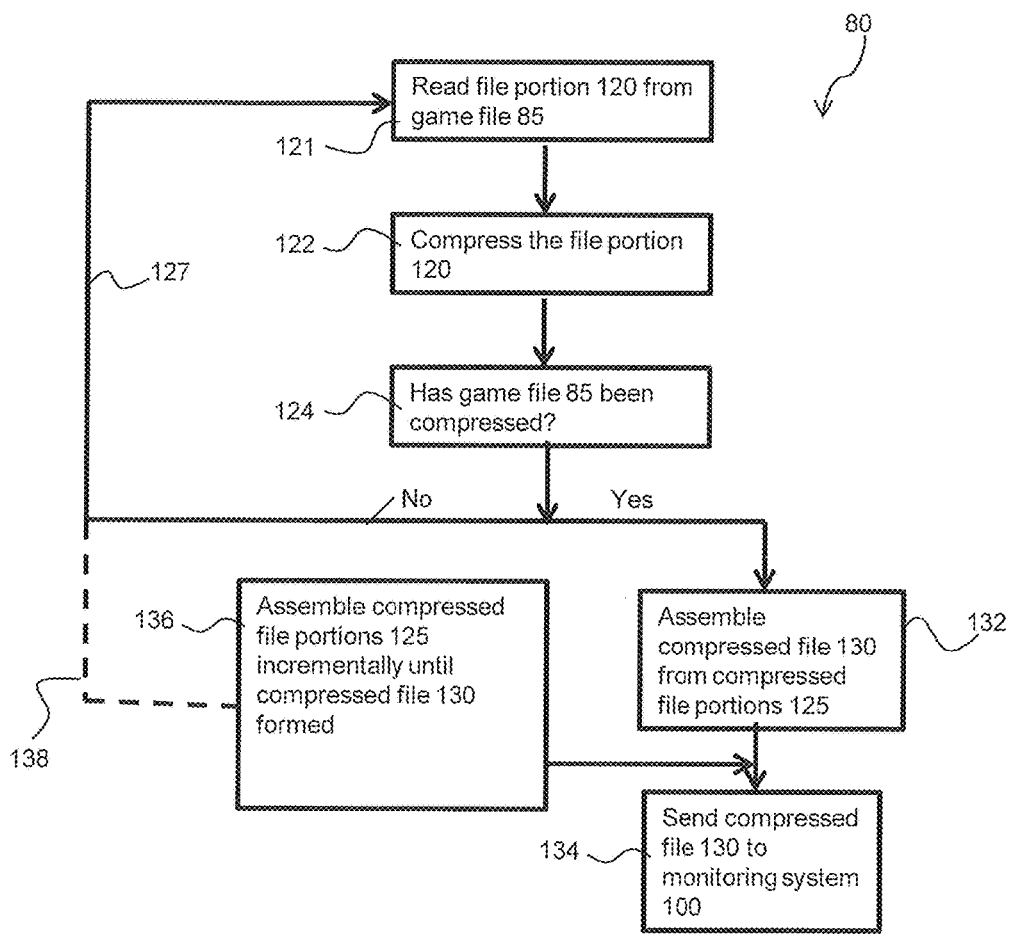
FIG. 7 is a schematic drawing illustrating a method according to one embodiment of the invention.

Referring to FIG. 7, in the method 80, a portion 120 of the computer readable file 85 is read from the game file 85 at step 121 and then the file portion 120 is compressed to reduce its file size at step 122. At step 124, the game file 85 is checked to see if it has been fully compressed. If not, then the reading step 122 and compressing step 122 are repeated until the entire game file 85 has been read and compressed into separate or individual compressed file portions 125, as indicated by line 127. Once the game file 85 has been compressed, the compressed file portions 125 are then assembled into a compressed game file 130 at step 132. The compressed file 130 is then sent to the monitoring system 100 at step 134, where is processed through the verification algorithm to verify that the compressed file is authorised for use in the gaming machine 1, as described above. If the verification is unsuccessful, then a signal is sent by the monitoring system 100 to the gaming machine 1 to disable it, preventing implementation of the game file 85 on the gaming machine 1. If the verification is successful, meaning that the validation token 95 is read and successfully passes through the verification algorithm, then the game file 85 is authorised for use in the gaming machine 1. It will be appreciated that the compressed game file 130 may either be sent over a wired or wireless network to the monitoring system 100, or may be stored in a suitable carrier medium (such as a Compact Flash card 115) to be read by the monitoring system.

In another embodiment, step 124 may be omitted and the method simply returns along line 127 to the reading and compression steps 121, 122 until the game file 82 has been compressed.

In a further alternative embodiment, the compressed game file 130 is assembled incrementally after each file portion 120 is compressed at step 136. That is, after each compression step 122, the compressed file portion 125 is assembled with to another compressed file portion 125 to form a partly assembled compressed file, thus assembling the compressed game file 130 gradually, as indicated by dotted line 138. Once the compressed file 130 is complete, it is then sent to the monitoring system 100 at step 134. Hence, in this alternative, the file portions 120 are incrementally compressed and the compressed game file 130 can be assembled piecemeal after each compression of a file portion 120 or assembled once all the file portions 120 are compressed into their individual compressed file portions 125.

Hence, in the method 80, the compressed file 130 is sent to the monitoring system 100, which may be unable to process the larger sized (uncompressed) game file 85, whereas the gaming machine 1 reads and generates the signature result 119 from the game file 85 using the seed value 117 received from the monitoring system 100. Thus, the verification process is performed more efficiently and easily for larger sized game files 85 without delay or compromise on the file size of the game file 85.

Figure 8:
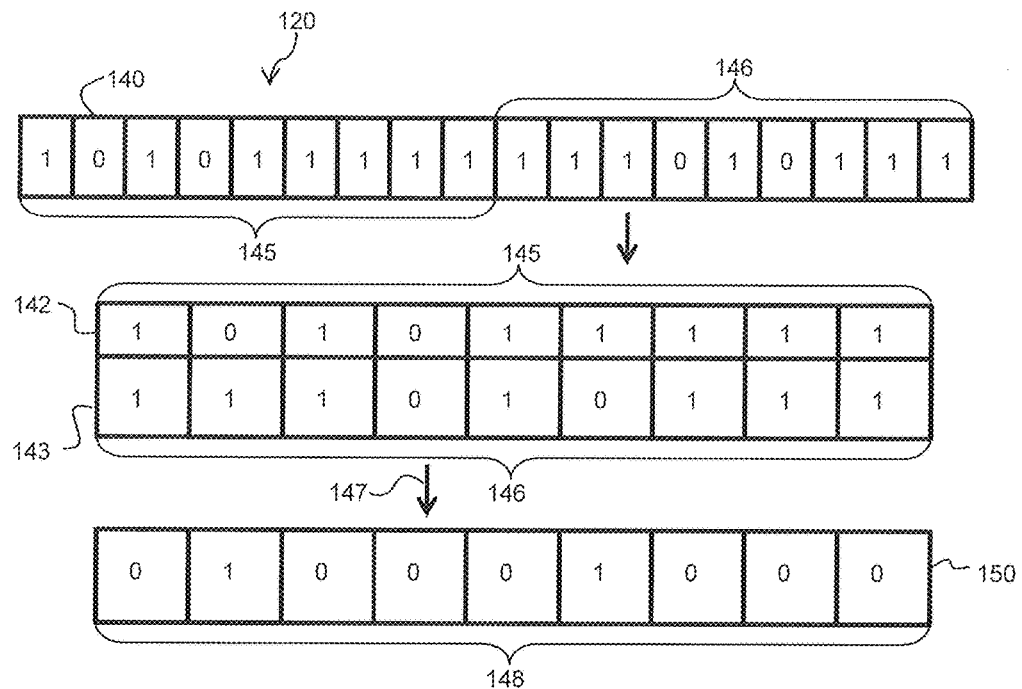
FIG. 8 is a schematic drawing illustrating one compression technique that may be used in the method according to an embodiment of the invention.

Referring to FIG. 8, one technique for the compression step 122 is illustrated. In this technique, the file portion 120 is "folded" in half to reduce its file size. As shown in FIG. 8, the file portion 120 comprises a binary data sequence 140 of bytes. To compress this file portion 120, the data sequence 140 is divided in half with the halves 142, 143 being placed adjacent each other so that the data sequences 145, 146 of each half 142, 143 are aligned. The aligned halves 142, 143 are then transformed using a suitable algorithm 147 into a single data sequence 148, creating a compressed file portion 150 half in size. In this embodiment, the transformation algorithm is the commercially available transformation algorithm XOR but in other embodiments a different transformation algorithm may be used, such as a CRC 32 algorithm. In any event, the transformation algorithm enables reduction of the file size of the file portion 120.

As shown in FIG. 8, the XOR transformation algorithm transforms any aligned binary numbers that are the same into a "0" while transforming any aligned binary numbers that are different into a "1". Hence, in the data sequence 148 of the compressed file portion 150, two bits of the same type (1 and 1 or 0 and 0) from the data sequences 145, 146 have been changed to a 0, while two different bits (1 and 0 or 0 and 1) from the data sequences 145, 146 have been changed to a 1. By using this folding technique, the file portions 120 can be collapsed or compressed by 50% (folding by 2). For example, the file portion 120 may initially have a file size of 4 KB and after being folded in the manner described above, the compressed file portion 148 has a file size of 2 KB. Thus, the compressed file portion 150 is processed more efficiently and avoids file corruption that occurs in prior art verification methods.

In addition, by repeating this folding technique on the compressed file portion 150, the file portion 120 can be collapsed or compressed by more than 50%, such as folding by 4 (25%), 8 (12.5%) and so on.

While there is some loss in data due to compression, as with any compression technique, the integrity of the file portion 120 (especially if it is relating to image information) is kept intact.

Figure 9:
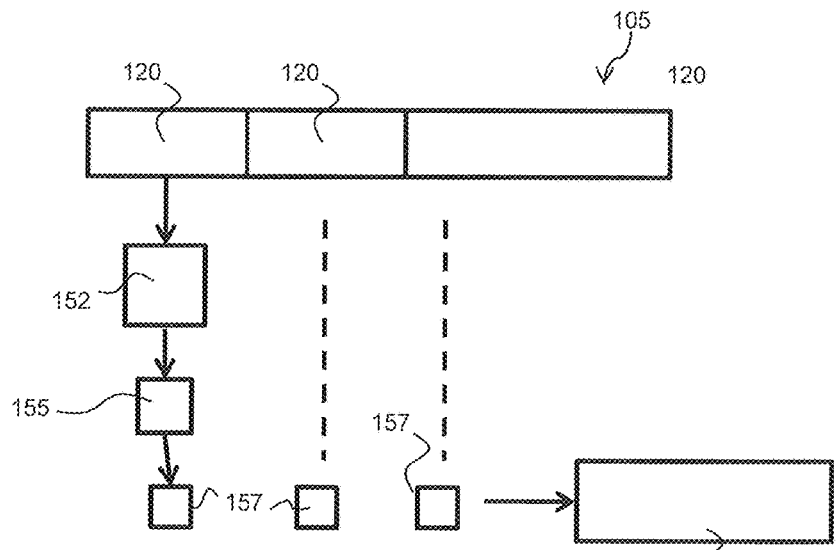
FIG. 9 is a schematic drawing illustrating another compression technique that may be used in the method according to another embodiment of the invention.

Referring to FIG. 9, another technique for the compression step 122 is illustrated. In this compression technique, the file portions 120 are compressed using a compression algorithm to reduce the file portion in size. As shown in FIG. 9, a game file 85 of around 4 GB can be divided into smaller data packets (being the file portions 120) of 1 KB. Each data packet or file portion 120 is sent through a compression algorithm 152 (such as a CRC 32 compression algorithm) to reduce its size from 1 KB down by a factor of 2 (i.e. folded in half) to a compressed file portion 155 500 bytes. This may be repeated until the compressed file portion 157 is only 4 bytes. The compressed file portions 157 are then assembled into a compressed file 159 and then send to the monitoring system 100. In this way, any differences in each data packet 120 indicating corruption can be detected during the compression and assembly steps while still enabling quicker and more efficient processing. The reduction factor in this embodiment is 256 (being a reduction from 1024 bytes to 4 bytes). However, in other embodiments, different reduction factors may be used depending on the compression algorithm. As with the embodiment of FIG. 8, other suitable compression algorithms may be used instead of the CRC 32 algorithm, such as XOR.

The computer readable file 85 is typically written to and stored in a computer readable carrier medium, such as a memory card, smart card, a radio frequency identification (RFID) device, USB key or drive, magnetic card or other equivalent portable electronic storage device. Preferably, the carrier medium comprises a flash memory card (such as a Compact Flash card, also referred to as a CF card) as this form of carrier medium is commonly used in the gaming industry. However, it will be appreciated that other embodiments make use of alternate carrier media, and the present disclosure should not be limited to any particular form of carrier medium. The writing may be achieved by substantially any conventional technique, and involves writing data to the carrier medium.

The method 80 may be implemented in several ways, but ideally the flash memory card storing the game file 85 is inserted into a memory card reader of a computing device to be read, compressed and the compressed file portions 125, 157 assembled into a compressed file 130, 159. The compressed file 130, 159 is then sent to the monitoring system 100 for verification as described in relation to FIG. 6 above. The game file 85 is installed into the memory of the electronic game controller 4 prior to or at the same time as the compressed file 130, 159 is sent to the monitoring system 100 for verification so as to be ready for calculating the signature result 119 from the same seed value 117 sent by the monitoring system 100.

Figure 10:
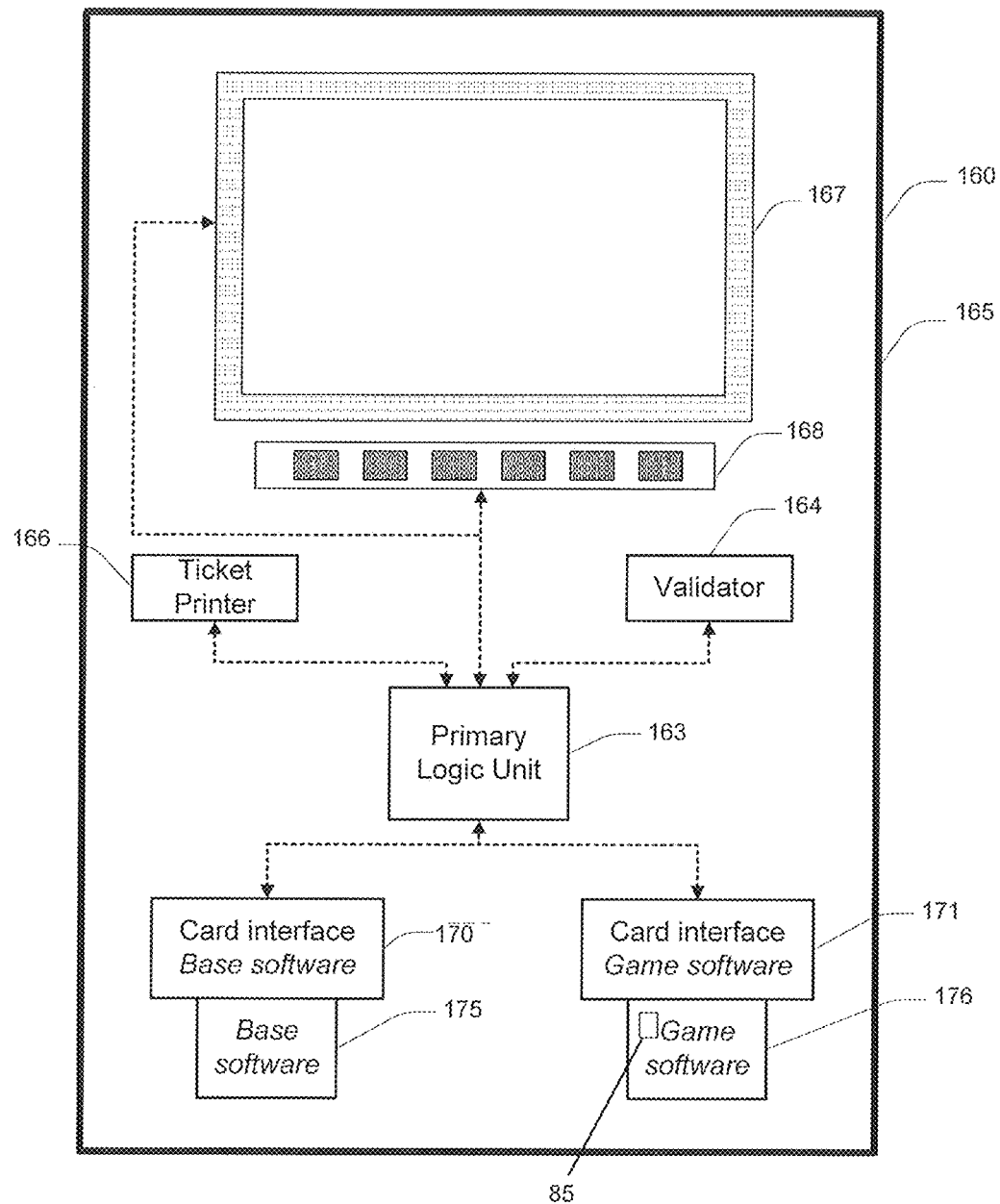
FIG. 10 is a front view of another electronic gaming machine.

It should also be appreciated that in other aspects, the invention may be implemented as a means to installing a compressed game file 130, 159 into a pre-existing gaming machine which has a limited memory processing or storage capacity that would prevent installing a standard game file 85. Referring to FIG. 10, an EGM 160 is illustrated for implementing the method 80 according to one embodiment of this aspect of the invention. The example of this form of EGM 160 should not be regarded as necessarily limiting, and other embodiments relate to alternate forms of EGM. It will be appreciated that FIG. 10 is not to scale, and is intended to provide a schematic overview of EGM components.

EGM 160 includes a central logic unit 163. Logic unit 163 includes processing means coupled to a memory unit for executing instructions embedded in software, thereby to provide a gaming functionality. Logic unit 163 further includes various inputs and outputs for connection to other components within the EGM, such bill validators, card readers, monitors, and the like.

The EGM 160 also has a value transfer mechanism in the form of a validator 164, which is configured for receiving credit, such as via currency tokens in the form of bank notes, and providing validator signals to logic unit 163 indicative of validator activity. Logic unit 163 and validator 164 are maintained within a casing 165. EGM 160 also includes within casing 165 a ticket printer 166 which, in conventional use, is responsive to instructions from logic unit 163 for printing tickets related to gaming activity. In this regard, EGM 160 also includes a display 167 coupled to logic unit 163 for providing a visual representation of gaming activity, and a user interface 168 for facilitating user interaction for the purpose of gaming.

In the present embodiment, logic unit 163 is configured to read data from carrier media. Specifically, logic unit 163 is in electronic communication with two card readers 170 and 171. In the present embodiment, these card readers 170, 1717 are configured to receive and interact with respective carrier media, such as Compact Flash cards. However, it will be appreciated that the present disclosure is not limited to any particular form of carrier media. Card reader 170 is configured for receiving a base software card 175, which maintains base software defined by computer executable code that is executed by logic unit 163 thereby to provide general functionalities to EGM 160. Card reader 171 is configured for receiving a game software card 176, which stores the game file 85 that contains game software defined by computer executable code that is executed by logic unit 163, thereby to allow EGM 163 to provide a specific game for play by a user (in this example being a video poker or slot machine game, such as games 8, 9).

In overview. EGM 160 starts up based on BIOS, and the logic unit 163 begins a procedure for loading software instructions carried by card 175. If that procedure is successful, logic unit 163 is able to begin a further procedure for verifying the game software carried by card 176 in accordance with the method 100. The BIOS in the logic unit 163 may also verify both the base card 175 and game card 176 prior to loading or executing any software maintained on those cards. If the verification is successful, EGM 160 is rendered functional to allow a user to play the games 8, 9 defined by the game software. In the case of successful validation token verification and BIOS verification, EGM 160 loads the software of cards 175 and 176, which provides a general operating framework for the machine (via card 175) and a game 8, 9 for execution on the EGM (via card 176).

In other embodiments the base software is maintained on a memory module of logic unit 163 as opposed to being maintained on portable carrier media such as card 175. Also, in some embodiments, the logic unit 163 has a dedicated verification module (not shown) that is designed to specifically apply its own verification algorithm (separate to the monitoring system 100) to the compressed game file 130, 159 stored on the game card 176. The verification algorithm in this case is used to confirm that the game 8, 9 carried by the compressed game file 130, 159 has been properly licensed for use on the EGM 160 by the venue operator from the game supplier. In this case, the logic unit 163 initially reads and then transmits the compressed game file 130, 159 to the verification module. After successful verification, the compressed game file 130, 159 is returned to the logic unit 163 to execute the compressed game file 130, 159 and implement the game 8, 9 on the EGM 160. Furthermore, the verification module may also be separate from the logic unit 163 for additional security.

In an alternate embodiment, rather than verifying the tokens of both cards 175 and 176 via BIOS at startup, the machine first verifies and loads software on card 175, and then proceeds to attempt loading and verifying the compressed game file 130, 159 maintained on card 176.

Figure 11:
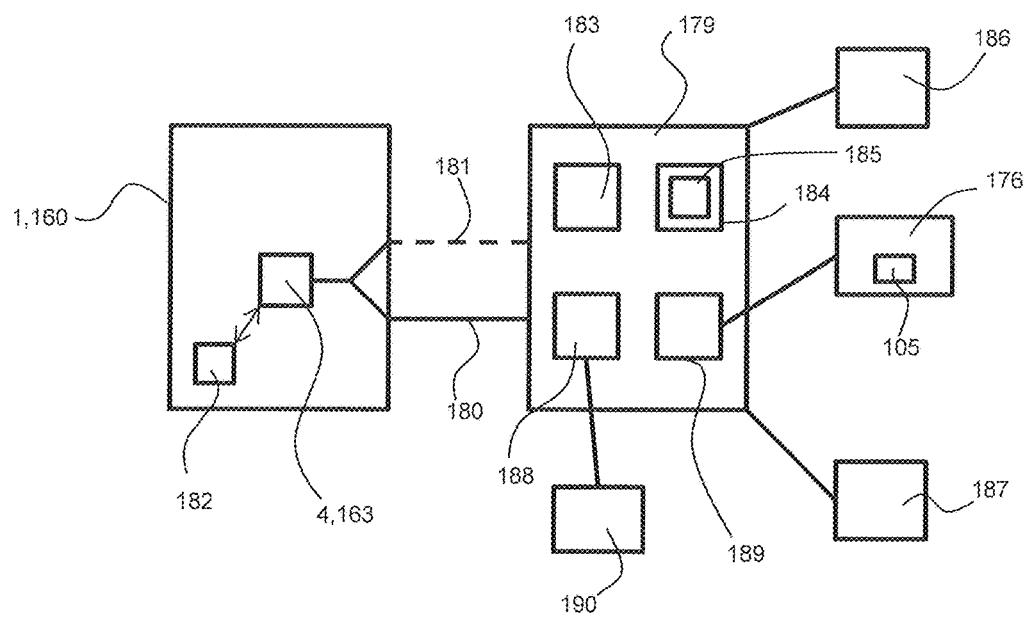
FIG. 11 is a schematic drawing of a system.

Referring to FIG. 11, a further embodiment is illustrated, where an intermediary computing device 179 is used to read the game file 85 and compress each file portion 120. The computing device 179 also assembles the compressed game file 130 from the compressed file portions 121. The computing device 179 then transmits the compressed game file 130, 159 to the gaming machine 1, 160 via a secure electronic communication link in the form of a wired connection 180 or wireless connection 181. Alternatively, the computing device 179 transmits the compressed file portions 125, 157 for assembly by the gaming machine 1, 160 into the compressed game file 130, 159. The electronic game controller 4 or logic unit 163 then proceeds to verify the compressed game file 130, 159, similar to the manner described above. In this embodiment, the verification algorithm may be performed by a dedicated verification module 182 in the gaming machine 1, 160 separate to the electronic game controller 4 or logic unit 163. In other embodiments, the verification module 182 is part of the electronic game controller 4 or logic unit 163. In yet another embodiment, the verification module 182 is part of the intermediary computing device 179, which then performs the verification process on the compiled compressed game file 130, 159.

In this embodiment, the computing device 179 is in the form of a PC having a microprocessor 183 coupled to a memory module 184. Memory module 184 includes software instructions 185, which enable PC 179 to perform method 100. In some embodiments some or all of software instructions 185 are hosted at a remote location or on an external device. A monitor 186 and user input devices 187 (such as mouse/keyboard devices) are coupled to PC 179 thereby to allow interaction with a user. PC 179 additionally includes a first interface 188, presently being a USB interface, and a second interface 189, presently being a flash card read/write interface (optionally provided by way of a PCM-CIA card, PC card or the like).

Interface 188 is presently coupled to a USB security device 190. In overview, device 190 provides security data required to enable performance of the method 80. The precise manner by which this is implemented varies between embodiments, including the likes of remote key verification, time-limited keys, and the like. The general rationale is to provide additional security and control in relation to the performance of method 80. Interface 189 is configured for interacting with a portable carrier medium, presently in the form of a Compact Flash card 176. As noted, this is exemplary only, and other embodiments make use of alternate carrier media.

Figure 12:
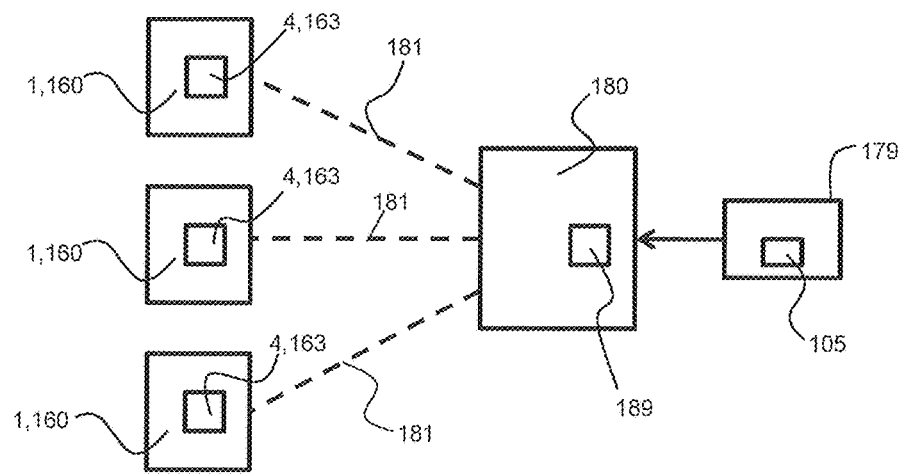
FIG. 12 is a schematic drawing of another system.

Referring to FIG. 12, a further embodiment of the invention is illustrated, in which the computing device comprises a secure server 192 in electronic communication with a plurality of gaming machines 1, 160 via a wireless connection 181. It will be appreciated that the server 192 may be in electronic communication with the gaming machines 1, 160 through a wired connection. This embodiment is essentially the same as the embodiment of FIG. 11 but the compressed game file 130, 159 is securely transmitted to the electronic game controller 4 or logic unit 163 of each respective gaming machine 1, 160. Thus, the same game file 85 may be centrally read, compressed and assembled into a compressed game file 130, 159 by the server 192 before being installed and verified by each respective gaming machine 1, 160. Also, the server 192 may read and compress the game file 85 into a compressed game file 130, 159 that is transmitted to the monitoring system 100 or other device for verification.

In yet a further embodiment, the intermediary computing device 179, 192 transmits the compressed game file 130, 159 to the monitoring system 100 and transmits the corresponding uncompressed game file 85 to the gaming machines 1, 160 for installation and verification before it implement operation of the games 8, 9 or the compressed game file 130, 159 as desired or where the EGM 1, 160 does not have the necessary memory processing power or storage capacity to implement the game file 85.

Figure 13:
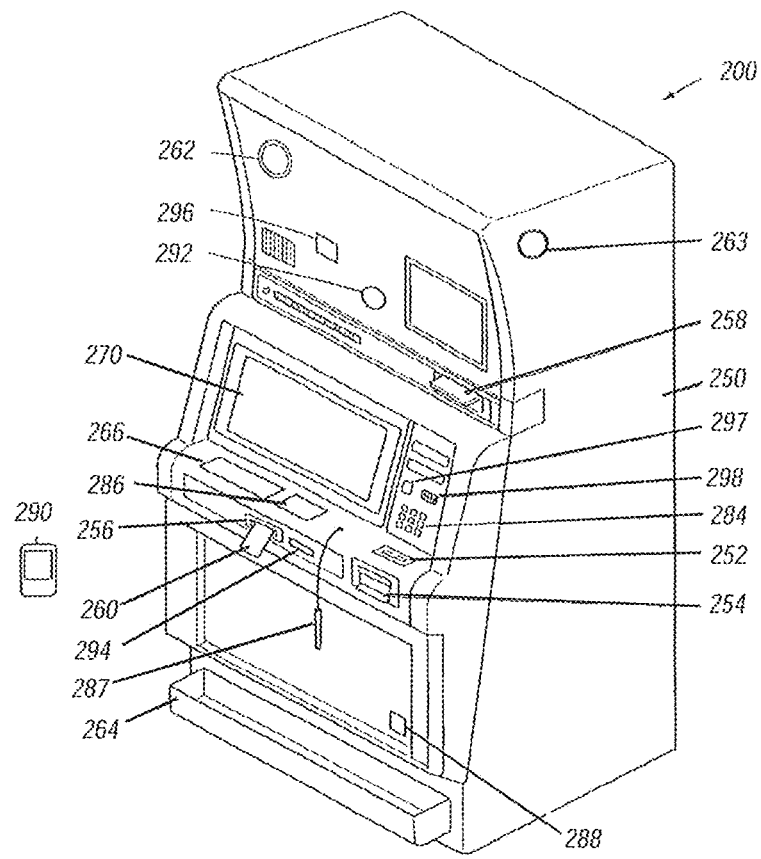
FIG. 13 is a perspective view of a further electronic gaming machine.

Referring to FIG. 13, another EGM 200 is illustrated. The EGM 200 may include a housing or cabinet 250 and one or more value transfer mechanisms or devices, which may include a coin slot or acceptor 252, a paper currency or bill acceptor 254, a ticket reader/printer 256 and a card reader 258, which may be used to input value to the EGM 200. A value transfer device may include any device that can accept value from a player. The topper (not shown) may be mounted to the top of the EGM 200.

If provided on the EGM 200, the ticket reader/printer 256 may be used to read and/or print or otherwise encode ticket vouchers 260. The ticket vouchers 260 may be composed of paper or another printable or encodable material and may have one or more of the following informational items printed or encoded thereon: the casino name, the type of ticket voucher, a validation number, a bar code with control and/or security data, the date and time of issuance of the ticket voucher, redemption instructions and restrictions, a description of an award, and any other information that may be necessary or desirable. Different types of ticket vouchers 260 could be used, such as bonus ticket vouchers, cash-redemption ticket vouchers, casino chip ticket vouchers, extra game play ticket vouchers, merchandise ticket vouchers, restaurant ticket vouchers, show ticket vouchers, etc. The ticket vouchers 260 could be printed with an optically readable material such as ink, or data on the ticket vouchers 260 could be magnetically encoded. The ticket reader/printer 256 may be provided with the ability to both read and print ticket vouchers 260, or it may be provided with the ability to only read or only print or encode ticket vouchers 260. In the latter case, for example, some of the EGMs 200 may have ticket printers 256 that may be used to print ticket vouchers 260, which could then be used by a player in other EGMs 200 that have ticket readers 256.

If provided, the card reader 258 may include any type of card reading device, such as a magnetic card reader or an optical card reader, and may be used to read data from a card offered by a player, such as a credit card or a player tracking card. If provided for player tracking purposes, the card reader 258 may be used to read data from, and/or write data to, player tracking cards that are capable of storing data representing the identity of a player, the identity of a casino, the player's gaming habits, etc.

The EGM 200 may include one or more audio speakers 262, a coin payout tray 264, an input control panel 266, and a colour video display unit 270 for displaying images relating to the game or games provided by the EGM 200. The audio speakers 262 may generate audio representing sounds such as the noise of spinning reels, a dealer's voice, music, announcements or any other audio related to a game. The input control panel 266 may be provided with a plurality of pushbuttons or touch-sensitive areas that may be pressed by a player to select games, make wagers, make gaming decisions, etc.

Figure 14:
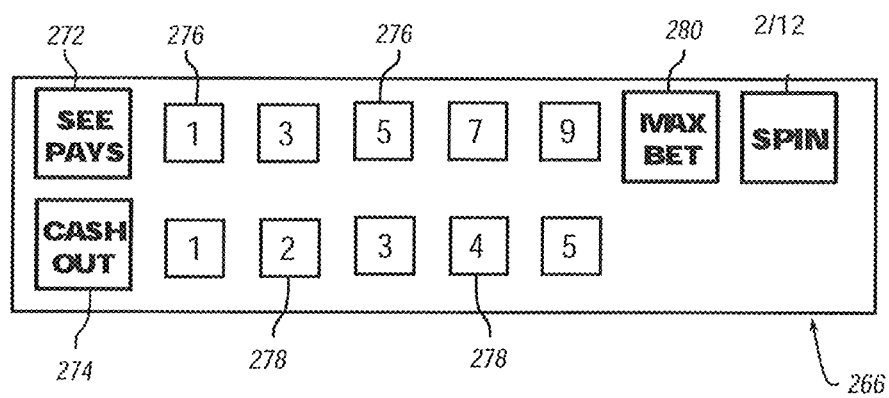
FIG. 14 is a schematic drawing of a control panel for the electronic gaming machine of FIG. 13.

FIG. 14 illustrates one possible embodiment of the control panel 266, which may be used where the EGM 200 having a plurality of reels. The control panel 266 may include a "See Pays" button 272 that, when activated, causes the display unit 270 to generate one or more display screens showing the odds or payout information for the game or games provided by the EGM 200. As used herein, the term "button" is intended to encompass any device that allows a player to make an input, such as an input device that must be depressed to make an input selection or a display area that a player may simply touch. The control panel 266 may include a "Cash Out" button 274 that may be activated when a player decides to terminate play on the EGM 200, in which case the EGM 200 may return value to the player, such as by returning a number of coins to the player via the payout tray 264.

The control panel 266 may be provided with a plurality of selection buttons 276, each of which allows the player to select a different number of pay lines prior to spinning the reels. For example, five buttons 276 may be provided, each of which may allow a player to select one, three, five, seven or nine pay lines.

The control panel 266 may also be provided with a plurality of selection buttons 78 each of which allows a player to specify a wager amount for each pay line selected. For example, the EGM 200 may be provided with five selection buttons 78, each of which may allow a player to select 1¢, 2¢, 5¢, 10¢ and 20¢, to wager for each pay line selected. In that case, if a player were to activate one of the buttons 276 to select five pay lines and then activate one of the buttons 278 to select 5¢ per pay line to be wagered or bet, the total wager would be $0.25.

The control panel 266 may include a "Max Bet" button 280 to allow a player to make the maximum wager allowable for a game. In the above example, where up to nine pay lines were provided and up to 20¢ could be wagered for each pay line selected, the maximum wager would be $1.80 The control panel 266 may include a spin button 282 to allow the player to initiate spinning of the reels after a bet has been made.

In FIG. 14, a rectangle is shown around the buttons 272, 274, 276, 278, 280, 282. It should be understood that the rectangle simply designates, for ease of reference, an area in which the buttons 272, 274, 276, 278, 280, 282 may be located. Consequently, the term "control panel" should not be construed to imply that a panel or plate separate from the housing 250 of the EGM 200 is required, and the term "control panel" may encompass a plurality or grouping of player activatable buttons.

Although one possible control panel 266 is described above, it should be understood that different buttons could be utilized in the control panel 266, and that the particular buttons used may depend on the game or games that could be played on the EGM 200. Although the control panel 266 is shown to be separate from the display unit 270, it should be understood that the control panel 266 could be generated by the display unit 270. In that case, each of the buttons of the control panel 266 could be a coloured area generated by the display unit 270, and some type of mechanism may be associated with the display unit 270 to detect when each of the buttons was touched, such as a touch-sensitive screen.

As noted above, the EGM 200 may include a mechanism by which the EGM 200 may determine the identity of the player. In particular, the card reader 258 may be used to read a card that carries an identification code that may be uniquely associated with the player so that the gaming unit can differentiate that player from all other players, or so that the gaming unit can differentiate that player as a member of a group of players from all player not a member of the group of players. The EGM 200 may also include equipment, such as a keypad 284, an input pad 286 (with optional stylus 287), a port (or antenna) 288 adapted to communicate via a wired or wireless link (infrared or radio frequency link, for example) to a mobile electronic device 290 (such as a personal digital assistant, smart phone or tablet), a camera 292, a scanner 294, a retinal (or iris) scanner 296, fingerprint scanner 297, and/or a microphone 298. The EGM 200 may include any one of the devices 258, 284, 286, 288, 290, 292, 294, 296, 297, 298, or the EGM 200 may include a combination of some or all of the devices 258, 284, 286, 287, 288, 290, 292, 294, 296, 297, 298.

In operation, a player may identify him or herself to the EGM 200 by entering a unique numeric or alpha-numeric code using the key pad 284, for example. Alternatively, the player may use his or her finger or the stylus 287 to sign his or her signature on the input pad 286. As a further alternative, the player may sign his or her signature on the mobile electronic device 290, which signature is then converted to electronic data, and the data is then transferred via the port/antenna 288 to the EGM 200. As yet another alternative, the player may sign his or her signature on a piece of paper that is then photographed using the camera 292 or scanned using the scanner 294 (or the bill acceptor 254) to convert the signature into electronic data. As an additional alternative, the player may place one of his or her fingers or his or her hand on the scanner 297, and the scanner 297 may generate an electronic data representation of the fingerprint on one or more of the player's fingers or an electronic data representation of the pattern of the entire hand. Alternatively, the camera 292 may be used to take a picture (live or still) of the player, the picture then being converted into electronic data. As a still further alternative, the player may place his or her eye up to the retinal (or iris) scanner 296, and the retinal (or iris) scanner 296 may generate an electronic data representation corresponding to the pattern of the retina (or iris) of the player. As yet another alternative, the player may speak into the microphone 298, and characteristics of the spoken words (or voiceprint) may be converted into an electronic data representation.

Figure 15:
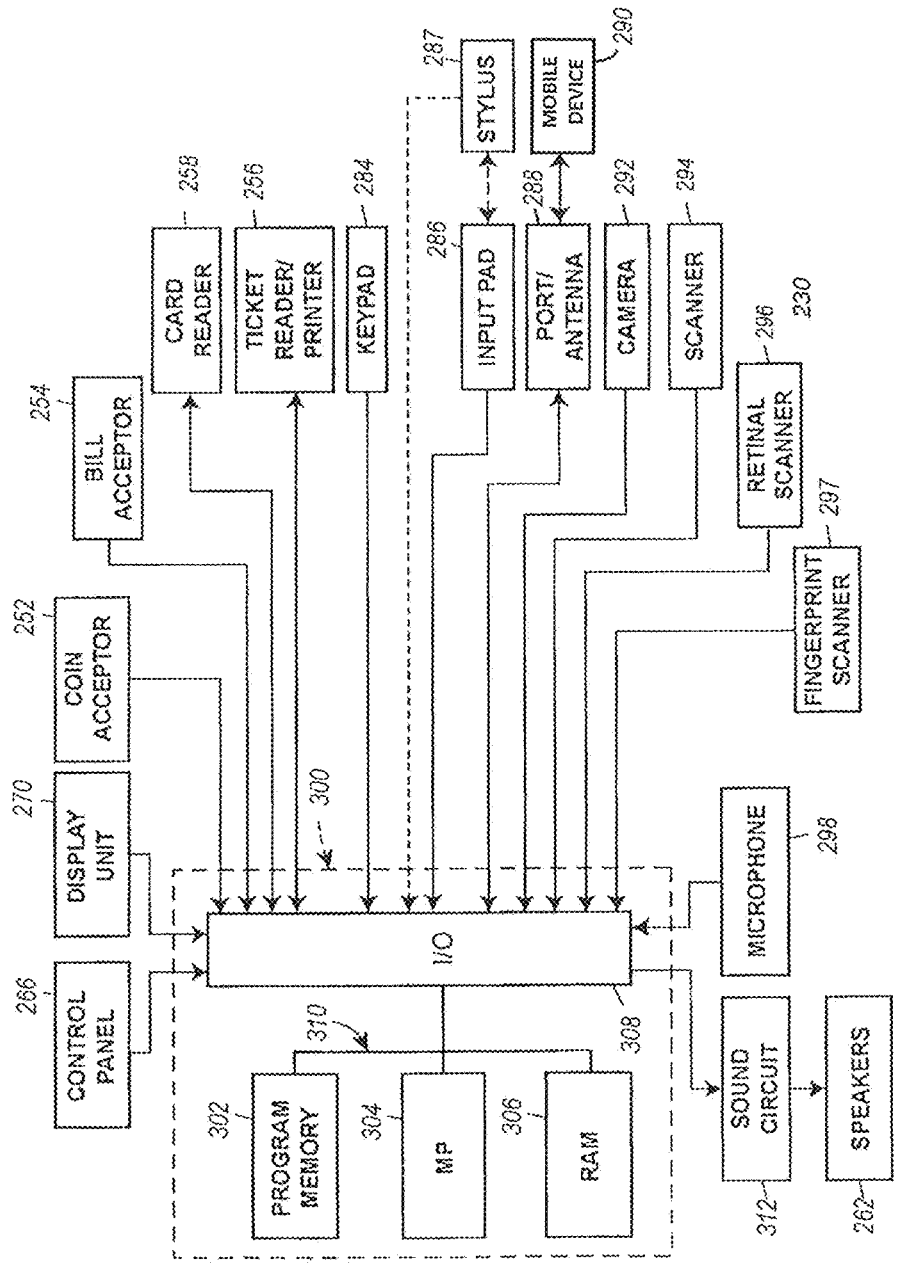
FIG. 15 is a block diagram of the electronic components of the electronic gaming machine of FIG. 13.

FIG. 15 is a block diagram of a number of components that may be incorporated in the EGM 200. Referring to FIG. 15, the EGM 200 may include a controller 300 that may comprise a program memory 304, a microcontroller or microprocessor (MP) 304, a random-access memory (RAM) 306 and an input/output (I/O) circuit 308, all of which may be interconnected via an address/data bus 310. It should be appreciated that although only one microprocessor 304 is shown, the controller 300 may include multiple microprocessors 304. Similarly, the memory of the controller 300 may include multiple RAMs 306 and multiple program memories 302. Although the I/O circuit 308 is shown as a single block, it should be appreciated that the I/O circuit 308 may include a number of different types of I/O circuits. The RAM(s) 304 and program memories 302 may be implemented as semiconductor memories, magnetically readable memories, and/or optically readable memories, for example.

FIG. 15 illustrates that the coin acceptor 252, the bill acceptor 254, the ticket reader/printer 256, the card reader 258, the control panel 266, the display unit 270, the keypad 284, the input pad 286 (and optionally the stylus 287), the port/antenna 288, the digital camera 292, the scanner 294, the retinal scanner 296, the fingerprint scanner 297 and the microphone 298 may be operatively coupled to the I/O circuit 308, each of those components being so coupled by either a unidirectional or bidirectional, single-line or multiple-line data link, which may depend on the design of the component that is used. The speaker(s) 262 may be operatively coupled to a sound circuit 312, that may comprise a voice- and sound-synthesis circuit or that may comprise a driver circuit. The sound-generating circuit 312 may be coupled to the I/O circuit 308.

As shown in FIG. 15, the components 252, 254, 256, 258, 266, 270, 284, 286, 287, 288, 292, 294, 296, 297, 298, 312 may be connected to the I/O circuit 308 via a respective direct line or conductor. Different connection schemes could be used. For example, one or more of the components shown in FIG. 14 may be connected to the I/O circuit 308 via a common bus or other data link that is shared by a number of components. Furthermore, some of the components may be directly connected to the microprocessor 304 without passing through the I/O circuit 308.

While the preferred embodiments have described applying the method to a game file 85, it will be appreciated that the invention may also be applied to other software files used by the gaming machines 1, 160, such as the base software in the base card 175. For example, the compression techniques described in relation to FIGS. 7 and 8 is not limited to game cards 176 or image files but can be applied to base cards 175 as well. In addition, the verification process may be applied to individual files, such as a BIOS image file, base image file, game image file or any combination of the BIOS, base and game image files to feed the seed values 117 and calculate the signature results 119.

Furthermore, it is contemplated that only one or more portions 120 of the game file 85 are compressed in order to reduce the file size into a more manageable amount without having the compress the entire game file 85. Hence, only a subset of the game file 85 is compressed by the method 80.

In some embodiments, the gaming machine comprises an input device for receiving commands from the player to play the game, wherein the input device comprises one or more buttons in electronic communication with the game controller to transmit the player commands to the game controller.

In some embodiments, the input device comprises one or more buttons on the housing, the buttons being in electronic communication with the game controller. In other embodiments, the buttons are arranged on a console of the housing. Alternatively or additionally, the input device comprises a touch sensitive surface on the display for receiving commands from the player, the touch sensitive surface being in electronic communication with the electronic game controller to transmit the player commands to the game controller.

In some embodiments, the gaming machine comprises a value transfer mechanism for receiving value from the player to make a bet and initiate a play of the game. In other embodiments, the value transfer mechanism also pays the prizes to the player using value in an amount equal to an awarded prize. It is further preferred that the housing comprises the value transfer mechanism. In one embodiment, the value transfer mechanism comprises one or more vending slots for paying and/or receiving value. In other embodiments, the value transfer mechanism comprises a value input/value output device. In further embodiments, the value transfer mechanism comprises a coin slot or acceptor, a paper currency acceptor, a ticket reader and/or printer or a card reader and/or writer.

In some embodiments, the method comprises reading two or more file portions of the computer readable file and repeating the compressing steps for each file portion. In other embodiments, the reading and compressing steps are repeated until the computer readable file is compressed. Preferably, each the file portion is read and compressed before reading another file portion.

In one embodiment, the compressed computer readable file is partly assembled using each compressed file portion after the compressing step. In other embodiments, the compressed computer readable file is assembled after all the file portions are compressed.

In some embodiments, the compressing step further comprises folding the at least one file portion in half. Preferably, the folding comprises aligning a first data sequence in one half of the at least one file portion with a second data sequence in the other half of the at least one file portion, and transforming the aligned data sequences into a single data sequence. In one embodiment, the method further comprises repeating the folding step on the single data sequence to produce a further data sequence of smaller file size. It is further preferred that the folding step is repeated to reduce the file size of the at least one file portion.

In some embodiments, the compressing step further comprises applying a compression algorithm to reduce the size of the at least one file portion by a factor of up to 256.

In some embodiments, the method comprises providing a non-transitory computer readable carrier medium storing the computer readable file and using a computing device to access the computer readable file on the computer readable carrier medium, the computing device performing the reading and compressing steps. Preferably, the computing device performs the assembling step. In one embodiment, the computing device performs the verification processing step.

In some embodiments, the computing device transmits the compressed compute readable file to a verification module in the gaming machine, the verification module being configured to execute the verification algorithm and perform the verification processing step.

In some embodiments, the computing device comprises a game controller of the gaming machine.

In some embodiments, the computing device is external to and in electronic communication with the gaming machine, the computing device being configured to transmit the computer readable file to the gaming machine after verification of the computer readable computer readable file. In other embodiments, the computing device is configured to transmit the compressed computer readable file to the gaming machine after verification of the compressed computer readable file.

In some embodiments, the computing device is external to and in electronic communication with a plurality of the gaming machines, the computing device being configured to transmit the computer readable file to each of the gaming machines after verification of the computer readable file. In other embodiments, the computing device is configured to transmit the compressed computer readable file to each gaming machine after verification of the compressed computer readable file.

In some embodiments of the system, the computing device reads and compresses two or more file portions of the computer readable file. Preferably, the computing device reads and compresses each file portion until the computer readable file is fully compressed. It is further preferred that the computing device reads and compresses each file portion before reading another file portion.

It is also preferred that the computing device partly assembles the compressed computer readable file using each compressed file portion after it has been compressed. In one embodiment, the computing device assembles the compressed computer readable file using the compressed file portions after all the file portions have been compressed.

In some embodiments, the computing device compresses the at least one file portion by folding the file portion in half. Preferably, the computing device aligns a first data sequence in one half of the at least one file portion with a second data sequence in the other half of the at least one file portion, and transforms the aligned data sequences into a single data sequence. It is further preferred that the computing device compresses the single data sequence to produce a further data sequence of smaller file size. In one embodiment, the computing device repeats folding the at least one file portion to reduce the file size of the file portion.

In some embodiments, the computing device applies a compression algorithm to reduce the size of the at least one file portion by a factor of up to 256.

In some embodiments, the computing device assembles the compressed computer readable file.

In some embodiments, the computing device performs the processes the compressed computer readable file through the verification algorithm. Preferably, the computing device comprises a game controller of the gaming machine.

In some embodiments, the computing device is external to and in electronic communication with the gaming machine, the computing device being configured to transmit the computer readable file to the gaming machine after verification of the compressed computer readable file. In other embodiments, the computing device is configured to transmit the compressed computer readable file to the gaming machine after verification of the compressed computer readable file.

In some embodiments, the computing device is external to and in electronic communication with a plurality of the gaming machines, the computing device being configured to transmit the computer readable file to each of the gaming machines after verification of the compressed computer readable file. In other embodiments, the computing device is configured to transmit the compressed computer readable file to each gaming machine after verification of the compressed computer readable file.

In some embodiments, a game controller of the gaming machine processes the compressed computer readable file through the verification algorithm. Preferably, the game controller comprises a verification module configured to execute the verification algorithm.

In some embodiments, the computer readable file comprises a game file having image, sound and data information relating to a game to be played on the gaming machine In some embodiments, the gaming machine comprises a mobile electronic gaming device. In other embodiments, the mobile electronic gaming device comprises a handheld electronic device. In one preferred form, the handheld electronic device comprises a handheld electronic gaming device or a smart phone. Alternatively, the gaming machine comprises a computer. In other embodiments, the computer is connected to a communication network.

It will be appreciated that while the preferred embodiments have been described in relation to an industry standard electronic gaming machine, the invention can be readily applied to other types of electronic gaming machines, including a personal computer (standing alone or connected to a communications network, LAN or WAN), mobile electronic devices (such as handheld or portable electronic devices like tablets and smart phones) and other electronic devices capable of displaying a game. In the case of mobile electronic device, in one arrangement it may permit the player to make bets using "virtual" credits that represent a monetary value, but do not require the player to make a monetary transaction. Instead, the invention may provide a tiered access to the various features of the game so that the player can make relatively small payments to access particular features of the game or obtain additional benefits during game play. An alternative arrangement would require the player to purchase virtual credits or tokens via an interface on the mobile electronic device or an online interface accessible by the mobile electronic device. Similarly, either of the above described arrangements can be applied where the invention is implemented on a personal computer (PC) connected to the internet (wirelessly or not). In one example of the implementation, the PC would access an online casino over the internet to play the game of the invention or the game of the invention would be part of a social networking website. It is also contemplated that the player could also make regular payments to subscribe to continue playing the game on the mobile electronic device, PC or other electronic device.

In an alternative embodiment, the gaming machine also provides an option for the player to play with either credits based on a monetary amount or virtual credits as discussed above. This can be implemented by way of a selection menu prior to playing the selected game or by providing a suitable menu button on screen during play of the selected game.

In another aspect, the invention includes a computer program configured to perform the invention. In this way the invention can be implemented in various ways on a gaming machine. In a further aspect, the invention includes a gaming system configured comprising a central processing unit (such as a computer or computational processor) configured for communication with a gaming machine to perform the invention. In a yet another aspect, the invention includes a non-transitory computer readable or carrier medium carrying computer executable code that, when executed on a central processing unit configured for communication with a gaming machine, causes the central processing unit to perform the invention. In this case, the non-transitory computer readable carrier medium includes an external hard drive, a memory device, including a memory card, smart card, a radio frequency identification (RFID) device, USB key, magnetic card or other electronic storage device.

While the illustrated embodiments include an electronic display on which the array of game positions is displayed, it will be recognized that the disclosed embodiments could instead incorporate mechanical or electro-mechanical reels to define the array of game positions. In fact, to the extent that the game positions, game symbols or operation of the gaming machine described herein would require a modification of such mechanical or electro-mechanical reels, it will be recognized that the embodiment represents a change in the structure or operation of a machine, rather than simply a variation in the rules of playing a game. In addition or in the alternative, the variation in the game positions, game symbols or operation of the gaming machine described herein may be viewed as analogous to a method for utilizing a new game apparatus (like a new deck of cards), rather than simply as a new set of rules in and of themselves.

It will further be appreciated that any of the features in the preferred embodiments of the invention can be combined together and are not necessarily applied in isolation from each other. For example, the compression techniques of FIGS. 6 and 7 could be both performed on the same file portion 120 to produce a hybrid compression technique. Similar combinations of two or more features from the above described embodiments or embodiments of the invention can be readily made by one skilled in the art.

Thus, it can be observed that by compressing portions of the computer readable game file and producing a compressed computer readable file that is processed through the verification algorithm, game files can be processed quickly and efficiently for use in the gaming machine 1, 160, 200. Therefore, game designers are able to use higher quality images and hence produce game files that have significant file sizes of 4 GB or more without concerns that the game file cannot be processed, is processed slowly and inefficiently and/or becomes corrupted. All these advantages of the invention result in an improved operation of the gaming machines 1, 160, 200. Furthermore, since the files are compressed prior to verification, the method permits older gaming machines with lower processing power to still implement games that have larger file sizes and/or higher quality images that such older gaming machines would ordinarily be unable to implement. In all these respects, the invention represents a practical and commercially significant improvement over the prior art.

Although the invention has been described with reference to specific examples, it will be appreciated by those skilled in the art that the invention may be embodied in many other forms.

The invention claimed is:

1. A method of verifying a computer readable file for use in a gaming machine comprising:
   reading at least one portion of said computer readable file;
   compressing said at least one file portion to reduce its file size to generate at least one compressed file portion;
   assembling a compressed computer readable file using said at least one compressed file portion;
   receiving the compressed computer readable file at a monitoring system; and
   processing said compressed computer readable file through a verification algorithm at the monitoring system to verify that said compressed computer readable file is authorized for use in said gaming machine
   wherein said processing includes transmitting a seed value to a gaming machine in which the computer readable file is installed, receiving a signature result generated by the gaming machine using the computer readable file, and comparing the signature result from the gaming machine to either a stored signature result paired with the seed value and stored in a memory module of the monitoring system or a signature result dynamically generated by a central processing unit of the monitoring system from the seed value.

2. The method of claim 1, further comprising reading two or more file portions of said computer readable file and repeating the compressing step for each file portion.

3. The method of claim 2, wherein said reading and compressing steps are repeated until said computer readable file is compressed.

4. The method of claim 2, wherein each said file portion is read and compressed before reading another file portion.

5. The method of claim 2, wherein said compressed computer readable file is partly assembled using each compressed file portion after said compressing step.

6. The method of claim 1, wherein said compressing step comprising folding said at least one file portion in half.

7. The method of claim 6, wherein said folding comprises aligning a first data sequence in one half of said at least one file portion with a second data sequence in the other half of said at least one file portion, and transforming the aligned data sequences into a single data sequence.

8. The method of claim 7, further comprising repeating said folding step on said single data sequence to produce a further data sequence of smaller file size.

9. The method of claim 6, wherein said folding step is repeated to reduce the file size of said at least one file portion.

10. The method of claim 1, wherein said compressing step comprises applying a compression algorithm to reduce the size of said at least one file portion by a factor of up to 256.

11. A system for verifying a computer readable file for use in a gaming machine, comprising:
    a non-transitory computer readable medium storing said computer readable file; and
    a computing device configured to:
      access said computer readable file on said non-transitory computer readable medium;
      read at least one portion of said computer readable file;
      compress said at least one file portion to reduce its file size to generate at least one compressed file portion; and
      assemble a compressed computer readable file using said at least one compressed file portion; and
    a monitoring system comprising a central processing unit and a memory module, the monitoring system configured to:
      receive the compressed computer readable file from the computing device;
      process said compressed computer readable file through a verification algorithm to verify that said computer readable file is authorized for use in said gaming machine;
      transmit a seed value to a gaming machine in which the computer readable file is installed;
      receive a signature result generated by the gaming machine using the computer readable file; and
      compare the signature result from the gaming machine to either a stored signature result paired with the seed value and stored in the memory module of the monitoring system or a signature result dynamically generated by the central processing unit of the monitoring system from the seed value.

12. The system of claim 11, wherein said computing device reads and compresses two or more file portions of said computer readable file.

13. The system of claim 12, wherein said computing device reads and compresses each said file portion until said computer readable file is fully compressed.

14. The system of claim 12, wherein said computing device reads and compresses each said file portion before reading another file portion.

15. The system of claim 12, wherein said computing device partly assembles said compressed computer readable file using each compressed file portion after it has been compressed.

16. The system of claim 11, wherein said computing device compresses said at least one file portion by folding said file portion in half.

17. The system of claim 16, wherein said computing device aligns a first data sequence in one half of said at least one file portion with a second data sequence in the other half of said at least one file portion, and transforms the aligned data sequences into a single data sequence.

18. The system of claim 17, wherein said computing device compresses said single data sequence to produce a further data sequence of smaller file size.

19. The system of claim 16, wherein said computing device repeats folding said file portion to reduce the file size of said at least one file portion.

20. The system of claim 11, wherein said computing device applies a compression algorithm to reduce the size of said at least one file portion by a factor of up to 256.

* * * * *